(12) United States Patent
Morris (10) Patent No.: US 7,631,263 B2
(45) Date of Patent: Dec. 8, 2009

(54) METHODS, SYSTEMS, AND COMPUTER PROGRAM PRODUCTS FOR CHARACTERIZING LINKS TO RESOURCES NOT ACTIVATED

(75) Inventor: Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 391 days.

(21) Appl. No.: 11/446,606

(22) Filed: Jun. 2, 2006

(65) Prior Publication Data

US 2007/0283291 A1 Dec. 6, 2007

(51) Int. Cl.
*G06F 3/00* (2006.01)
*G06F 9/00* (2006.01)
*G06F 17/00* (2006.01)

(52) U.S. Cl. .................. 715/738; 715/762; 715/745

(58) Field of Classification Search .......... 715/760, 715/969, 804, 805, 962, 762, 763, 751, 752, 715/753, 737, 738, 745
See application file for complete search history.

(56) References Cited

U.S. PATENT DOCUMENTS

| | | | | |
|---|---|---|---|---|
| 5,806,077 | A * | 9/1998 | Wecker | 715/236 |
| 5,937,404 | A * | 8/1999 | Csaszar et al. | 707/9 |
| 6,049,812 | A * | 4/2000 | Bertram et al. | 715/205 |
| 6,144,962 | A * | 11/2000 | Weinberg et al. | 707/10 |
| 6,222,541 | B1 * | 4/2001 | Bates et al. | 715/786 |
| 6,405,192 | B1 | 6/2002 | Brown et al. | |
| 6,418,433 | B1 | 7/2002 | Chakrabarti et al. | |
| 6,598,072 | B1 | 7/2003 | McBrearty et al. | |
| 6,665,838 | B1 | 12/2003 | Brown et al. | |
| 6,947,924 | B2 | 9/2005 | Bates et al. | |
| 6,980,986 | B1 | 12/2005 | Lawrence et al. | |
| 7,328,401 | B2 * | 2/2008 | Obata et al. | 715/205 |
| 7,346,604 | B1 * | 3/2008 | Bharat et al. | 707/3 |
| 2003/0149694 | A1 | 8/2003 | Ma et al. | |
| 2005/0071465 | A1 * | 3/2005 | Zeng et al. | 709/224 |
| 2005/0235224 | A1 * | 10/2005 | Arend et al. | 715/792 |

OTHER PUBLICATIONS

Borges et al., "Ranking Pages by Topology and Popularity Within Web Sites," arXiv:cs/AI0412002, v3, pp. 1-15 (Dec. 9, 2004).
Schwab et al., "Adaptivity Through Unobstrusive Learning," pp. 1-8 (Publication Date Unknown).
Massa et al., "Page-reRank: Using Trusted Links to Re-Rank Authority," pp. 1-7 (Publication Date Unknown).

* cited by examiner

*Primary Examiner*—Tadesse Hailu
*Assistant Examiner*—Anita D Chaudhuri (57) ABSTRACT

Methods, systems, and computer program products for characterizing links to resources that are not activated are disclosed. According to one aspect, a page is presented via a user interface of a client device, the page including a link to a resource accessible via a network through activation of the link. The client device determines whether the link on the page is not activated. The link is characterized based on at least one of information associated with the link, the resource, and the page responsive to determining that the link is not activated.

49 Claims, 5 Drawing Sheets

METHODS, SYSTEMS, AND COMPUTER PROGRAM PRODUCTS FOR CHARACTERIZING LINKS TO RESOURCES NOT ACTIVATED

TECHNICAL FIELD

The subject matter described herein relates to information gathering related to web browsing. More particularly, the subject matter described herein relates to methods, systems, and computer program products for characterizing links to resources, such as those presented in a web page using a browser.

BACKGROUND

A great deal of effort has been invested in recent years in order to determine the behavior and preferences of Internet computer users. These behaviors and preferences have been analyzed in order to make marketing decisions, customize content, customize and sort search results, and for other related purposes associated with Internet computer users. These efforts have focused on gathering information directly from a user or from a related individual concerning the user's behavior and preferences and have included tracking the behavior of the user by the use of cookies.

The information gathered is often inaccurate or incomplete due to limitations in the information gathering approach of conventional information gathering systems. For example, most conventional information gathering systems maintain counts of positive activities, such as a count of the number of times a link is clicked or a number of times a page is visited. This counting is usually performed in response to an action by a user, such as clicking a link, and is usually performed at a server, such as a search engine. Some search engines count visited links as positive events and use such counts to increase the likelihood that the visited links will be returned to a user when a subsequent search query is sent from the user to the search engine. Unfortunately, when a user follows a link and does not like the content or does not find the link useful, conventional search engines still return the link and do so with a higher preference during subsequent searches.

Information which is missing from conventional tracking efforts and which is not tracked includes data about what a user does not do while browsing the Internet and which links a user does not follow or does not like when followed. Negative counts for links are not maintained, and information associated with negative activity is not tracked within conventional information gathering systems. The general lack of information about what Internet computer users do not do and what information they do not find useful creates lost opportunities for marketing, customizing content, customizing search results and for other related purposes associated with Internet computer users.

Additionally, because conventional systems track information on the server side of a transaction and because servers may only respond to positive actions that are sent to the server for processing, server-side tracking limits the amount and type of information that may be tracked. Accordingly, server-side tracking results in less information being available for use in relation to making. marketing decisions, customizing content, customizing and sorting search results, and for other related purposes associated with Internet computer users. Server tracking is also site specific and does not consider differences in preferences between users.

Accordingly, in light of these difficulties associated with conventional behavior and preference gathering mechanisms, there exists a need for improved methods, systems, and computer program products for characterizing links to resources not activated within a page in a browser.

SUMMARY

According to one aspect, the subject matter described herein comprises methods, systems, and computer program products for characterizing links to resources not activated. One method includes presenting, via a user interface of a client device, a page including a link to a resource accessible via a network through activation of the link; determining, by the client device, whether the link on the page is not activated, and characterizing the link based on at least one of information associated with the link, the resource, and the page responsive to determining that the link is not activated.

The subject matter described herein for characterizing links to resources not activated may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to conventional behavior and preference gathering mechanisms, the subject matter described herein provides for characterizing links to resources not activated within a page, such as within a page displayed using a browser. Where previously, information gathering systems collected information based upon positive actions by an Internet computer user (e.g., clicking a hypertext link), the methods, systems, and computer program products described herein characterize resources associated with links not activated within a page. By adapting information gathering approaches to collect information related to actions that are not activated by an Internet computer user, enhancements to marketing, customizing content, customizing search results, and for other related purposes associated with Internet computer users may be achieved.

Additionally, rather than tracking information only on the server side of a transaction as performed by conventional systems, the methods, systems and computer program products described herein may track information on the client side of a transaction instead of or in addition to the server side of the transaction. By tracking actions taken and actions not taken on the client side of a transaction, more accurate and complete information about user interests may be obtained. Additionally, client-side tracking provides an opportunity to track information that is user specific. This user-specific information or preferences may be used to modify queries issued by the user of a client node to enhance the user's search experience and may be used to filter, reorder, and customize search results returned from a server to limit information that is not of interest to the user.

What a user does not do can be viewed as things the user does zero times, but this statistic alone does not capture the full-extent of what can be known about what the user does not do while browsing on the Internet. For example, there is a difference in knowing as user has been repeatedly given the opportunity to take an action and has passed or refused and in knowing that a user has never had the opportunity to perform a task. Accordingly, the description herein provides for identifying when a user has the opportunity to take an action and chooses not to take the action. These negative results may be stored and retrieved at a later time to streamline information presented to a user by filtering content on a web page to improve the user's Internet experience. Further, the term "not activated" as used herein includes links not activated within specific contexts in addition to links never activated. For example, data can be gathered on links not activated including links not activated after 6pm, links not activated using INTERNET EXPLORER, and/or links not activated while working.

Figure 1:
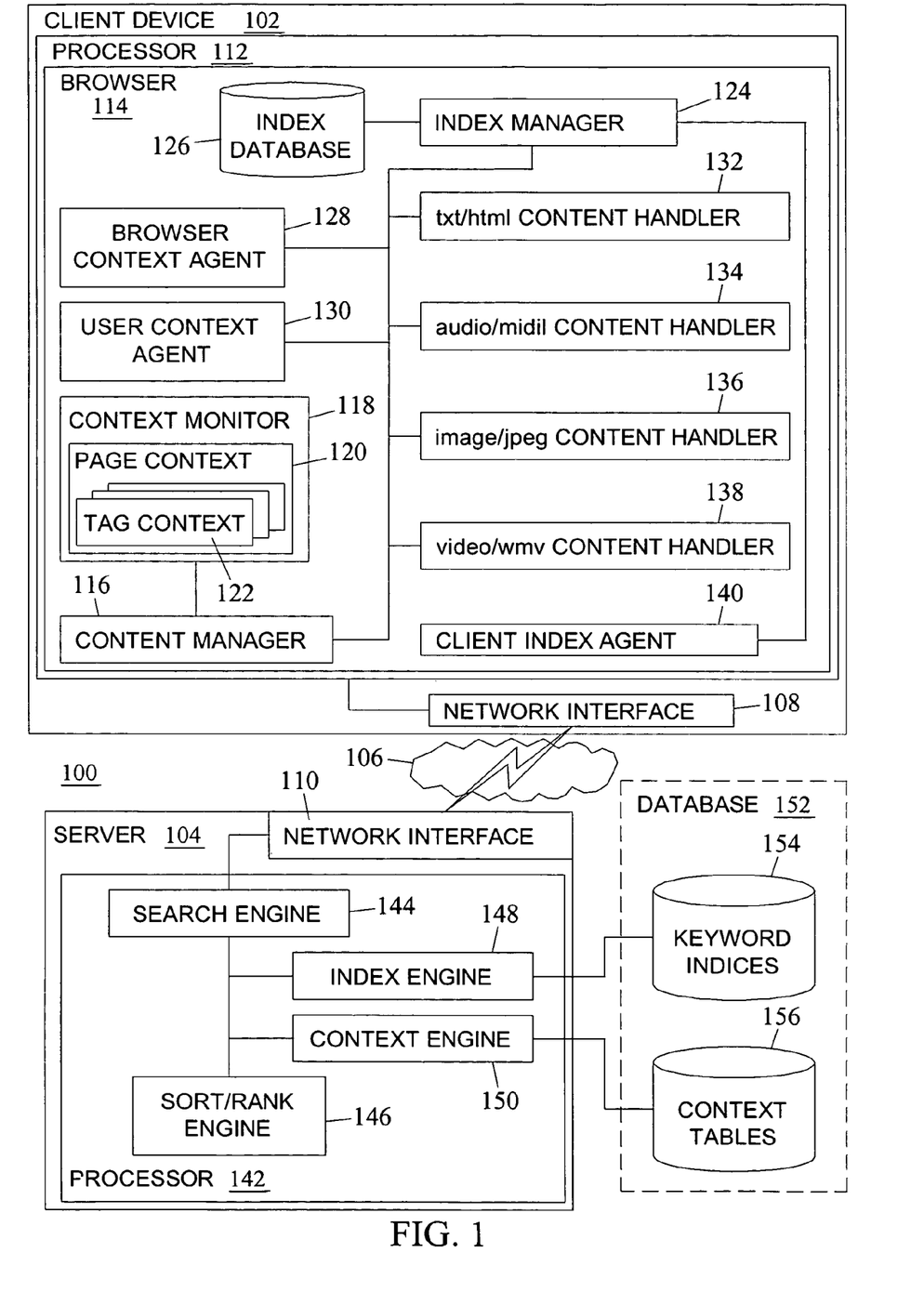
FIG. 1 is a block diagram of an exemplary system for characterizing links to resources not activated within a page in a browser according to an embodiment of the subject matter described herein.

FIG. 1 illustrates an exemplary system 100 for characterizing links to resources not activated within a page in a browser. In the illustrated example, system 100 includes a client device 102 and a server 104. Client device 102 and server 104 interconnect via a network 106. Client device 102 and server 104 may respectively include network interfaces 108 and 110 for communicating with each other over network 106. Client device 102 may include a personal computer, a personal digital assistance (PDA), or any other device capable of communication with a remote device in order to retrieve web-oriented content. Server 104 may include any device capable of responding to requests for web-oriented content. For example, server 104 may be a web server and/or a web-based search engine. Network 106 may include any interconnection mechanism that may allow client device 102 and server 104 to communicate. For example, network 106 may be the Internet, a corporate intranet, or any other communication network.

A processor 112 may be used to run computer programs on client device 102. Processor 112 may execute instructions for a browser 114. Browser 114 may include a web browser for browsing Internet web sites by a user of client device 102. Browser 114 includes a content manager 116 for receiving and detecting a type, such as multimedia Internet message extension (MIME) type, associated with data entities and data streams received by client device 102. Content manager 116 may route data to and may coordinate data flows among other modules within browser 114.

A text/hypertext markup language (text/html) content handler 132, an audio content handler 134, an image/jpeg content handler 136, and a video/windows media viewer (WMV) content handler 138 provide content handling capabilities for the respective types of browser contents or MIME types. Content manager 116 routes data entities and streams to specific content handlers based on the type of the data entity or stream. Each content handler may parse and present the respective data, and may interact with the user in certain situations to retrieve responses from the user associated with the respective content. The functionality of a content handler will be described in more detail below.

A context monitor 118 may use information provided by content manager 116 to discover relationships between various parts of a page of different types. This information is typically provided to the content manager 116 by content handlers 132-138. Relationships may be used to discover or to infer context data in and among the data entities and/or streams within a page processed by the content handlers 132-138. For example, context data within an HTML portion of a page may include information associated with prices, theater tickets, or any other type of information that may indicate a relationship associated with the parts of a page. A separate portion of the page of a type other than HTML, such as FLASH content, may contain information as well. The context monitor is aware of the formatting relationship between the HTML content and the FLASH content. Additionally the context monitor is capable of relating information from the HTML content to FLASH content, for example. Information about a car in the HTML content may be related to an image of a car in the FLASH content or to an image of a car of type image/jpeg depending on the format relationship of the different content types. A page context 120 and tag contexts 122 may be present within a given page that is accessed by browser 114. For example, page context 120 may include key words within the page or near an object contained within the page, such as an image. Tag contexts 122 may contain keywords and data discovered within the tags that contain an object, such as an image file or an audio file. Information that is associated with a page, such as a title or a subject, may be detected. Additionally, pages may include a reference to additional metadata, such metadata specified by the world wide web consortium (W3C) standard. Examples of W3C metadata that may be associated with a web page include a creator, a creation data, a subject, and copyright information. Each content type may be associated with a schema that aids in the discovery of context information including relationships. For example, a schema may apply to an extensible markup language (XML) portion of a page, a hypertext markup language (HTML) portion of a page, or any other data type that is structured. In order to provide the ability to gather data associated with new content types, context monitor 118 may support a plug-in architecture for each content type just as browsers support a plug-in architecture to support new content handlers.

An index manager 124 may create index data from the content and data that is generated from the information gathered by context monitor 118. Index manager 124 may store the index data within an index database 126. Index manager 124 may provide access to and maintain the index data for browser 114. Index data may include content indices and other data associated with contextual information.

It should be noted that index database 126 is illustrated within browser 114 in FIG. 1 for ease of illustration. However, index database 126 may be persistent and may be stored to a hard disk or other persistent storage medium and/or made accessible to other applications without departure from the scope of the subject matter described herein.

A browser context agent 128 may gather information about browser activity and usage patterns. For example, information about which page led to the current page, repetition of patterns, whether a page has been referenced from other pages in the past may all be gathered by browser context agent 128. Browser context agent 128 may include a plug-in or a component within browser 114.

A user context agent 130 may gather information about activities of the user of browser 114 and may relate this information to contextual information associated with each activity. For example, information may include information associated with a price range entered in a search, images saved from pages to the user's device, or page links emailed to others by a user may be gathered by user context agent 130. Accordingly, user context agent 130 may be a plug-in or a component of context manager 118 without departure from the scope of the subject matter described herein.

A client index agent 140 may enable external entities, such as web applications, to communicate with index manager 124 and applications using index manager 124. Client index agent 140 may issue queries to external servers and/or issue queries to index manager 124 on behalf of external servers and applications.

A processor 142 within server 104 may be used to run computer programs on server 104. For example, processor 142 may execute instructions for a search engine 144. Search engine 144 may utilize standard search engine technology enhanced to support context based searches in addition to standard keyword searches available from most search engines within conventional systems.

Search engine 144 may interface with a sort/rank engine 146, an index engine 148, and a context engine 150. Sort/rank engine 146 may support a plug-in architecture that utilizes rules-based processing, context data, site statistics, and keyword data, for example, to prioritize search results. Index engine 148 may utilize standard text based indexing technology, for example, in order to prioritize search results. Context engine 150 may maintain context records for each text based indexing syntax associated with server 104, may maintain relationships between text based indexing syntax and context records, and may support search of context records and relationships to allow for context sensitive searches. Context engine 150 may utilize links not activated data, both at an individual user level for personalization and aggregated for general use in filtering search results, in ranking search results, and for other related activities associated with producing search results. Data associated with links not activated may be stored within a database 152 which includes a keyword indices database 154 accessible by index engine 148 and a context tables database 156 accessible by context engine 150.

Using system 100, information associated with links not activated in a browser and additional contextual information related to the links not activated may also be maintained on the server within a database, similar to client index database 126. Exemplary contextual information associated with links not activated that may be stored in client index database 126 and its server analogs includes an opportunity factor which will be described in more detail below, a date and time when a link was presented, a type of link (e.g., text, icon, flash, etc.), a page location, a link selected instead or a uniform resource locator (URL) entered by a user, and a URL of a resource in which the link was embedded which may include nested resources and accompanying resources for pages made of multiple peer resources and resources with embedded resources. Additional exemplary contextual information that may be stored in database 126 and its server analogs includes an index of pages visited, information about pages visited just prior to and just after an opportunity (e.g., content, site, etc.), and any data available from an analysis of the page containing link, any embedded elements within the page, user activity on the page and any metadata available that is associated with the user activity on the page.

According to one aspect, a determination as to whether a link is not activated can be based simply on the availability of the link for activation. For example, the mere presentation of the link on a page without a user "clicking" the link can be a determination that the link is not activated. In addition, some preset default time period may be used.

According to another aspect, an opportunity to activate a link that is not activated may be measured as an "opportunity factor." The term "opportunity factor" as used herein denotes any measure characterizing an opportunity provided to follow a link. The opportunity factor can as simple as a yes/no, or can represent more information. An opportunity factor may include information about an opportunity that an Internet computer user does not take. In a simple example, the opportunity factor may indicate that a link was loaded on a page. In other examples, an opportunity factor may include a number of times a link was in a page viewed by a user, a location of a link within a page, a type of link (e.g., text, icon, flash, etc.), a size of the link container referencing a link, a number of other links in the page, and the total, mean, median, mode, maximum, and minimum time that a link was presented in an area of the user interface that user could see. Still other examples of opportunity factor information may include a number of times the link appears within a page on a user interface, a number of times the page with the link is displayed on the user interface, a location of the link within the page on the user interface, a type of link including a text type link, an icon type link, and a flash type link, a size of a container referencing the link, and a number of links other than the link within the page.

Opportunity factors determined by other applications along with context data may be used to generate information similar to the information described herein with respect to a browser. Applications may share this information or store it in a common repository and use it in methods analogous to those described herein for a browser or in other methods some of which may be application specific. For example, people send links to other people via email often with a text message and subject line. These may be considered to have high opportunity factors since the user is typically presented with one link by a known friend, co-worker, or family member. The text in the message and subject may be analyzed for additional content. If a user does not follow the link, the information may be passed to components that store the data and generate statistics and rankings, for example, analogous to the browser content manager 116, index manager 124, and a content handler 132-138 as described herein.

Information associated with a link not activated, the resource or resources it is linked to, and/or the page the link appears on, may be used to characterize a link not activated. In addition, a link may be characterized based on an opportunity factor when the link is not activated. A characterization of a link may be modified based on information regarding other links accessed or not accessed by a user. A reference to the link and the characterization of the link may be stored in a database for use at the client nodes, for distribution to servers, and for distribution to other client nodes via a server. It should be noted that opportunity factor information may be gathered related to links activated and used in the analysis of links not activated as well as for other purposes.

Opportunity factor information collected at a client node may be communicated to a server and stored at the server. This opportunity factor information may be used by the server to filter, reorder and customize search results and may be distributed to other client nodes to allow other client nodes to use this opportunity factor information. In order to communicate opportunity factor information to client nodes, a server may include opportunity factor information as a link attribute, such as an HTML attribute, that is communicated with a link to the client nodes. In this way, opportunity factor information may be collected at a client node, communicated to a server and used either at the server or distributed to other client nodes. Customizations to search results presented by the server may include highlighting, bolding, and italicizing the search results.

An opportunity factor may be further used to determine the quality of the opportunity the user was presented with in relation to the link and may be used to characterize the value of presenting that link to the user at a later time or whether the link may be filtered upon a subsequent access to the web page. An opportunity factor may be used to generate a ranking of links that are not followed by ranking them in terms of negative preference while a link which a user has never had an opportunity to select may be given a neutral value.

A user preference value may be created based upon the characterization of the link and the user preference value may be use in a variety of ways to improve responses to web-based searches from the client side of the web-based search. A preference threshold may be defined for a search and a user preference associated with the results of the search may be compared with the preference threshold to determine whether a predetermined relationship between the user preference and the threshold exists, and an action may be activated based upon the result of the comparison. Actions that may be activated include preventing display of a link in response to access to pages that include the link, updating the user preference value associated with a link based on user preferences collected for other links, communicating the user preference value to a server, controlling search results presented to a user, and storing the user preference value at a server to allow the server to use the user preference in response to future search queries. For example, a preference threshold of 10 may be set to filter search results having links with user preferences less than 10 on a scale of 1 to 10, with 10 indicating the strongest preference. Search results having links with user preference values less than 10 may be omitted from display to the user.

Relationships among the various data described above may be used in calculating a ranking in the form of an opportunity factor. For example, the greater the number of opportunities a user has had to follow a link that is not selected, the greater the negative preference that may be assigned to the link in the form of an opportunity factor. Further, the more prominent the link based upon its type or location on the page when a link is not selected, the greater the negative preference that may be assigned to the link in the form of an opportunity factor. As well, the fewer alternative links on a page when a link is not selected, the greater the negative preference that may be assigned to the link in the form of an opportunity factor.

This opportunity factor may be augmented using information related to links a user has followed and other positive behaviors and data provided by the user or others concerning the user. For example, a link selected which has low positive preference may result in a lower negative preference for a link not followed on the same page than if the link followed had a high positive preference. As well, by allowing a user to explicitly mark or rank a link that is available or followed as negative, the user may be able to create content filters for use during subsequent accesses to a web page. Other types of categorizations are possible based on contextual information including metadata, particularly when combined with information gathered about user activity including links followed and pages viewed.

Many potential applications for use of opportunity factor information exist and may include, for example, retaining not-followed link indexes on a client computer and using them to filter and rank returned search results. As another example, thresholds for negative preferences may be defined by an application or a user of an application and when a not-followed link index count reaches a specified threshold, the associated link may be removed or marked to indicate that negative nature of the link. Further, information gathered about a user's positive preferences may be used to suggest that certain links that are not followed may possibly be of interest to the user. Additionally, if a link that is presented as a possible interesting link is still not followed, the link's negative preference may be increased and become more negative. As well, information concerning resources associated with the not-followed links may be used to mark links to similar resources as negative to apply an initial negative preference rating based on the rating of the similar resources. Further, search query results may be intercepted and modified to reduce the number of negative links returned prior to submitting the query results to the user. Search engines may also combine positive visits to a resource with negative data from users to give a combined preference that may be more meaningful to Internet computer users. A negative preference link may be recommended because it leads to a high preference link within the content displayed by following the negative preference link. Opportunity factor and content analysis may be used to generate rankings and other statistics, such as those described herein for resources that have never been presented to the user before. For example, a user who never follows links related to automobiles may have those links assigned a negative ranking which may be used to generate a negative ranking for ads for automobiles. Based on the negative rank generated the browser may take an action automatically such as filtering out the ad or may make actions available to the user associated with the ad, such as allowing the user to remove the add or change its negative ranking. Additional applications for the use of opportunity factor information are possible and all are considered within the scope of the subject matter described herein.

Figure 2:
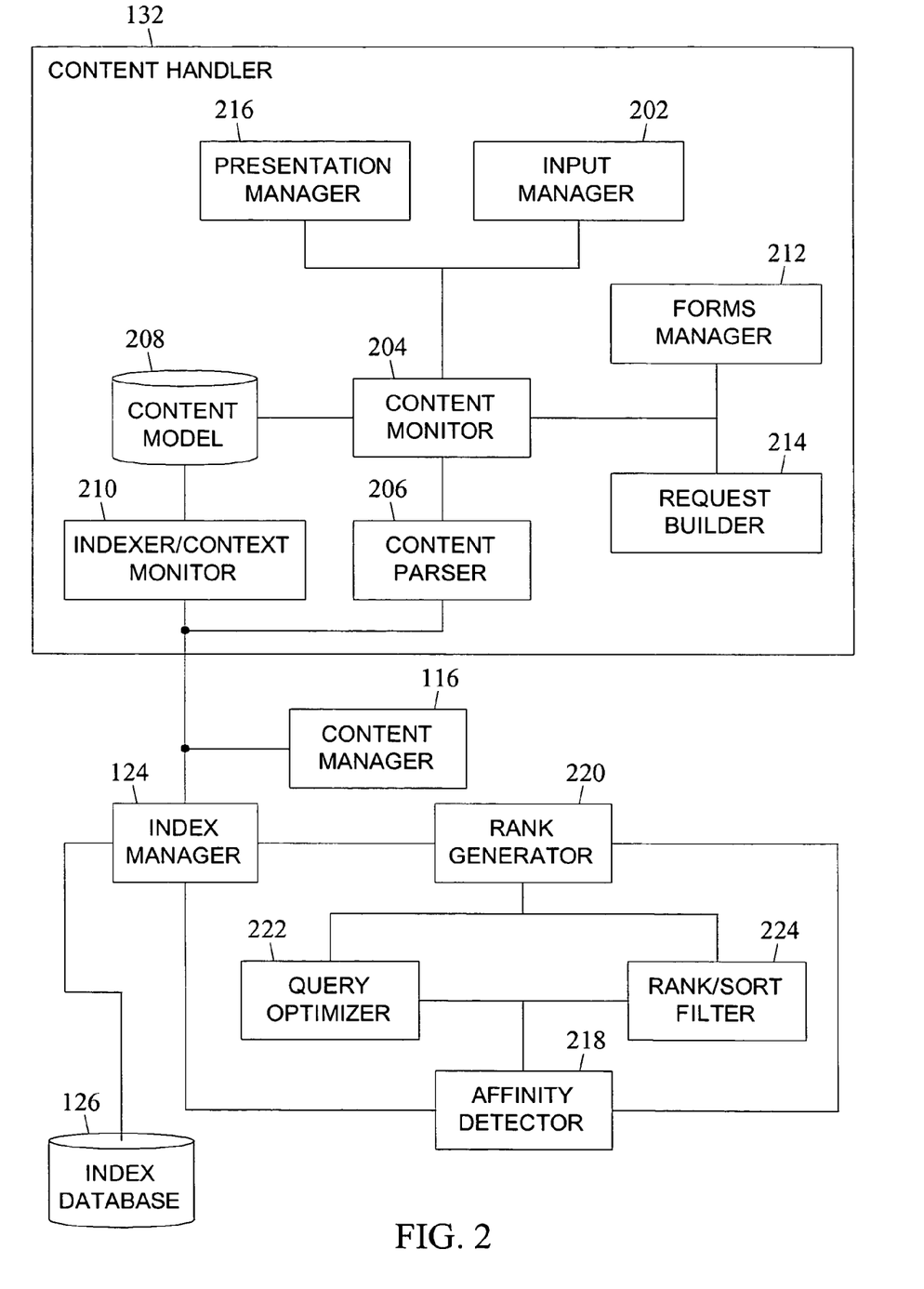
FIG. 2 is a block diagram of an exemplary architecture of a text/html content handler shown in FIG. 1 to provide a more-detailed illustration of the modules within a content handler according to an embodiment of the subject matter described herein.

FIG. 2 illustrates an exemplary architecture of a content handler, such as text/html content handler 132, to provide a more-detailed illustration of the modules within a content handler of system 100 and their use within the system and method described herein. Text/html content handler 132 may support determination of opportunity factors and a link or links that are not activated during each opportunity presented to a user. Additionally, text/html content handler 132 may gather contextual data for enhanced analysis and categorization, as will be described in more detail below. It is understood that content handlers 134, 136, and 138 illustrated in FIG. 1 may be similar in architecture to content handler 132.

An input manager 202 may process input received that is associated with the content under the control of content handler 132. Examples of such input may include mouse clicks and text entered by a user interacting with the presented content. A content monitor 204 may be provided to manage the content within content handler 132 and route user input related information to other appropriate components for processing. Information may be received by input manager 202 and passed to content monitor 204 for processing by content monitor 204 as well. Information associated with user input may also be provided to a context monitor, such as context monitor 118 of browser 114, to provide user activity context data in cooperation with or through user context agent 130 which may be associated with the links in the content of the page.

A content parser 206 may provide an input interface for text/html content handler 132 when received over a network 106 from a server 104 by content manager 116. Content parser 206 may receive data or a stream of data from content manager 116 which matches a type supported by text/html content handler 132. Content parser 206 may parse the data according to the type and may provide the data to content monitor 204 in a format/structure compatible with internal processing within text/html content handler 132. For purposes of illustration, character set UTF-8 may be assumed as the default character set representation, but many other formats are possible and all are considered within the scope of the subject matter described herein. Other data types, in fact, may require other representations be used by their content handlers.

Content monitor 204 may be viewed as the hub of communications within text/html content handler 132. Content monitor 204 may receive the parsed and structured content from content parser 206. Content monitor 204 may maintain a copy of the data received within a content model 208. Content monitor 204 may use schema to understand the content and to define the structure of data within content model 208. For example, content model 208 may be organized in a document object model (DOM) format and the schema used may be a schema of one of the HTML variants.

By defining schema and a structure of the data within content model 208, content monitor 204 may receive input information from content parser 206 and may detect opportunities for link selection within a page. Content monitor 204 along with content manager 116 may detect when an opportunity to select a link has ended and may thereby track links not select within a given opportunity. Content model 208 may provide schema and data in a format that provides an indexer/context monitor 210 with an opportunity to analyze the received data, detect relationships, and generate new information associated with the content and the relationships detected. Negative activity (e.g., actions not activated) information may be provided to and detected by an indexer/context monitor 210 for preprocessing in order to associate contextual data with each link or with a group of links before passing the data to index manager 124 for additional processing. When received by index manger 124 along with any context data gathered and/or detected by context monitor 118, additional contextual data and processing may be performed and any data collected or generated may be stored within index database 126.

From this data, additional data may be determined or generated including links never activated by the user and links never activated by anyone who has used the browser/application. As stated previously, the links never activated information may be contextually bounded by many factors, including one or more of time, activity, associated content, server site, page, and user. Various context categories may be constructed from the contextual data and these categories may be provided. Exemplary use categories include web activities such as searching, shopping, and researching. Exemplary content categories include content categories such as music, video, automobiles, various hobbies and professional interests.

Additionally, date and time categories may be generated depending upon the time of year or day that the information is generated.

Links not activated may be placed into these contextual categories and further processing may be performed on the categorized information. For example, in addition to links never activated, links never activated within one or more contextual categories may be documented. Further, the contextual categories may be considered individually or concurrently (e.g., shopping and autos between 7pm-10pm). The contextual categories may be analyzed with respect to whether they were in effect at the time a link was not activated (e.g., during an opportunity) or whether they were in effect prior to or after a contextual frame within which a link was not activated. A contextual frame may be viewed as a set of contextual categories associated with an opportunity within which a frame was not activated. An opportunity and at least a portion of its contextual frame may be referred to as an opportunity factor or opportunity frame, as described above.

An opportunity may be defined as a time period in which a link is in an active presentation space. Alternatively, an opportunity may be defined for a time period in which a link is visible to the user. Other definitions of an opportunity are possible. For example, and opportunity may be defined as a period of time that a user has active content from a particular service or related set of services. All links provided by the service(s) may be considered available during the defined period whether they were ever presented or not. The definition of an opportunity may be further adjusted based upon the desired characteristics for a given situation.

A forms manager 212 may provide support for forms-based content, such as HTML and XML-based vocabularies to associate form element names with any input provided within the form. Forms manager 212 may also package this form data in a format compatible for generating form submission requests. Once in a compatible format, a request builder 214 may generate forms and provide support for the submission of requests generated based upon the forms-based content.

A presentation manager 216 may present processed content to a user. Content handler 132 may be provided with access to an area of a display buffer associated with client device 102. Browser 114 may control the positioning and overall layout while presentation manager 216 may control the content forwarded to the display buffer for the area provided. For other content handlers, such as audio content handler 134, presentation management may involve audio signal conditioning or other processing rather than visual presentation. For example, audio content handler 134 may have access to the audio subsystem for presentation of audio.

Several exemplary applications are possible for use within system 100. An affinity detector 218 may make use of tracked links not activated. Affinity detector 218 may determine the relationships between links not activated as well as relationships between links activated and not activated. For example, affinity detector 218 may be configured to process links related to a particular subject context, such as cars, and to subjects that may be considered subordinate (e.g., sub-subjects) to cars, such as prices or safety. As part of its processing, affinity detector 218 may analyze information about the acts a user does not take. For example, when links to two sub-subjects of the subject of cars, such as prices and safety are available to a user, and the user selects prices over safety, affinity detector 218 may record the fact that the user did not choose safety. As well, if groups of users select price over safety at a measurable rate, this information may be recorded by affinity detector 218. Further, if users have never selected a link associated with sub-subject safety when a link associated with sub-subject prices is available, this information may be recorded.

Affinity detector 218 may also detect subject and content categories associated with each link among a set of links never activated. Using information about links activated, the affinity detector may group the links not activated into categories that project the likelihood that a link that has never been activated might be of interest to a user and therefore should be suggested. Accordingly, affinity detector 218 may enable making suggestions to users based upon this categorization to provide the user with an opportunity to follow a link that the user may otherwise overlook or choose not to follow.

A rank generator 220 may use data associated with links not activated, including contextual data, to rank or categorize the links not activated. Rank generator 220 may include functionality for ranking based upon opportunities presented, for ranking based upon page placement of a link, for ranking based upon a visible time for a link, for ranking based upon a user's interest in other links available, and for ranking based upon combinations of the previously described exemplary ranking generators including affinity-based rankings and categorizations. There are many other ranking generators that are possible and all are considered within the scope of the subject matter described herein.

A query optimizer 222 may use data from a rank generator, such as rank generator 220 or affinity detector 218, to modify a search query provided to browser 114 to produce a search with results that more closely match what is desired by the searcher. Data from links not activated, including rankings, may be used to add, remove, or modify terms/expressions to the provided query in order to exclude content determined to be of little interest or to include content not seen that has been determined to be of possible interest.

A rank/sort filter 224 may use data about links not activated, including data generated by rank generator 220 or affinity detector 218, to filter out search results that the generated data indicates have little relevance or interest to the searcher. For example, the results of a search may be re-ranked or re-ordered to present links to resources not activated that have been indicated by the generated data to be relevant or of interest to the searcher. Another example of a rank/sort filter may work with page content rather than search results. By filtering out content and providing a new layout (e.g., position, color, font, etc.) for the remaining content on a page, a rank/sort filter may improve the usability of a page. This type of rank/sort filter may be thought of as a link mover/remover. A link pre-fetch filter may also be created to decide whether to pre-fetch a linked resource based upon previous links activated and links not activated.

Using system 100, web clients, such as client device 102, may gather data about user preferences and what users do not prefer that cannot be collected by web servers. The information may be specific to a user and may provide very detailed information about user preferences and about what users do not prefer. Further, this data may be kept private and used under the control of the user without publishing this information. This information may be restricted to client-side distribution or may be combined with data from a server on the client-side. Alternatively, this data may be provided to servers to add to the information gathered through server activities such as web crawling, page visit counts, and other associated services.

Figure 3:
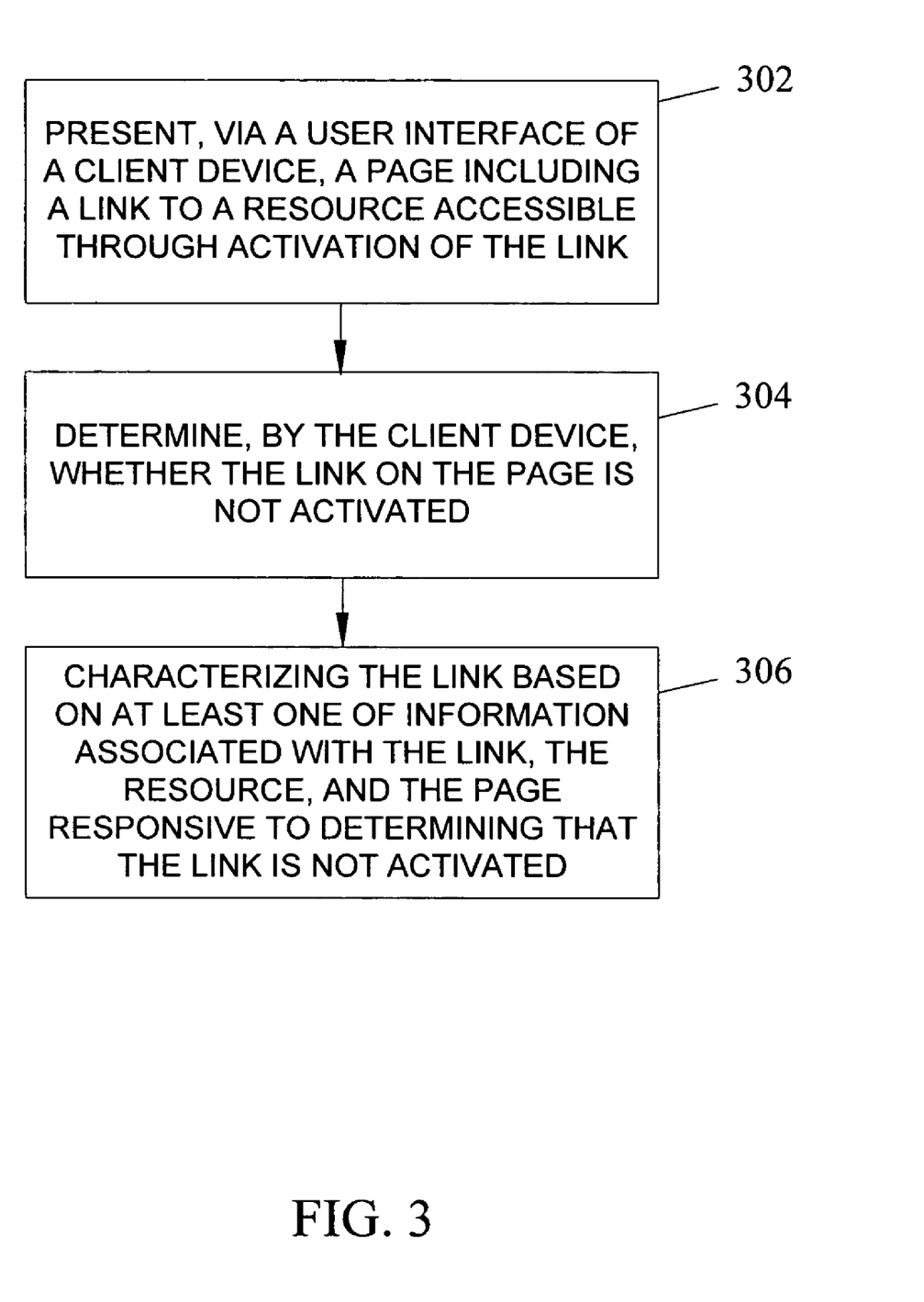
FIG. 3 is a flow chart illustrating an exemplary process for characterizing links to resources not activated according to an embodiment of the subject matter described herein.

FIG. 3 illustrates a process for characterizing links to resources not activated. At block 302, the process presents, via a user interface of a client device, a page including a link to a resource accessible via a network through activation of the link. For example, browser 114 may present a web page including an HTML link to a resource, such as another web page or a file, accessible via a network through activation of the link.

At block 304, the process determines, by the client device, whether the link on the page is not activated. For example, browser 114 may determine by use of content manager 122 and content handler 132, when a user has not activated a link that is presented. Here, the opportunity factor may additionally be considered in the determination.

At block 306, the process characterizes the link based on at least one of information associated with the link, the resource, and the page responsive to determining that the link is not activated. For example, rank generator 220 may use data associated with links not activated, their associated resource (s), and/or the page they are on to rank or characterize links not activated. According to another aspect, the opportunity factor can also be used to rank or characterize links not activated.

Figure 4:
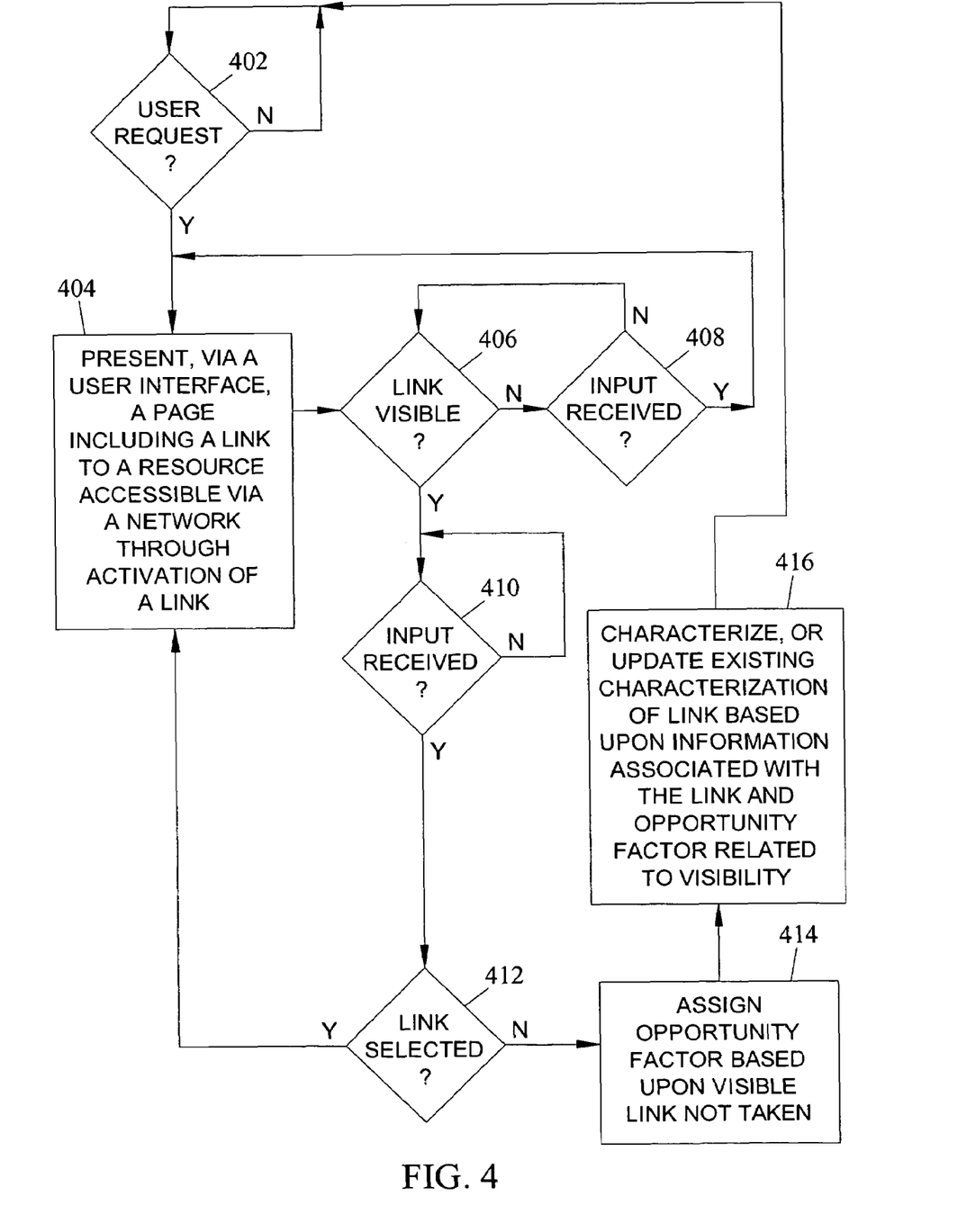
FIG. 4 is a flow chart illustrating an exemplary process for characterizing links to resources not activated within a page in a browser using visibility as to measure an opportunity factor according to an embodiment of the subject matter described herein.

FIG. 4 illustrates an exemplary process for characterizing links to resources not activated within a page in a browser using visibility to measure an opportunity factor. At decision point 402, the process may wait for a user request to present a page. At block 404, a page may be presented via a user interface including a link to a resource accessible via a network through activation of the link. At decision point 406, the process may determine whether the link is in a viewable portion of the user interface. If the link is not in a viewable portion of the user interface, the process may determine whether any input has been received at decision point 408. When input has not been received, as determined at decision point 408, the process may determine whether the link is within a viewable area of the screen again and the process may iterate between a determination at decision point 406 regarding visibility and a determination at decision point 408 regarding input. This processing reflects the possibility that the page may be self-updating and thus may change without receiving input.

If input is received, as determined at decision point 408, the process may return to block 404 to present the page associated with the input received, via the user interface, including a link to a resource accessible via a network through activation of the link. The input may also result in presenting the same page again, such as when the input received is a page down request or a browser resize request. In the first case, information gathering for the previous link may be discarded because it was never within the viewable area of the user interface and information gathering for the new link may begin. In the second case, information gathering may continue, since a possibility of the link being or becoming viewable remains.

When the process determines that a link is within the viewable area of the user interface at decision point 406, the process may wait for input at decision point 410. When input is received, the process may determine at decision point 412 whether the link was selected. When the link was selected, as determined at decision point 412, the process may return to block 404 to present the page associated with the input received, via the user interface, including a link to a resource accessible via a network, the resource accessible through activation of the link. Information gathering for the link may be discarded because it was followed in order to present the page upon return to block 404 and information gathering for a new link may begin. Or the information may be retained for other purposes, such as tracking data on links selected.

When the process determines that a link was not selected at decision point 412, an opportunity factor for the link may be assigned at block 414. The opportunity factor may be based upon the fact that the link was within a viewable area of the user interface and was not selected by the user. At block 416, the process may characterize or update an existing characterization of the link based upon information associated with the link and the opportunity factor related to visibility. The process may then return to decision point 402 to await a new user request.

Figure 5:
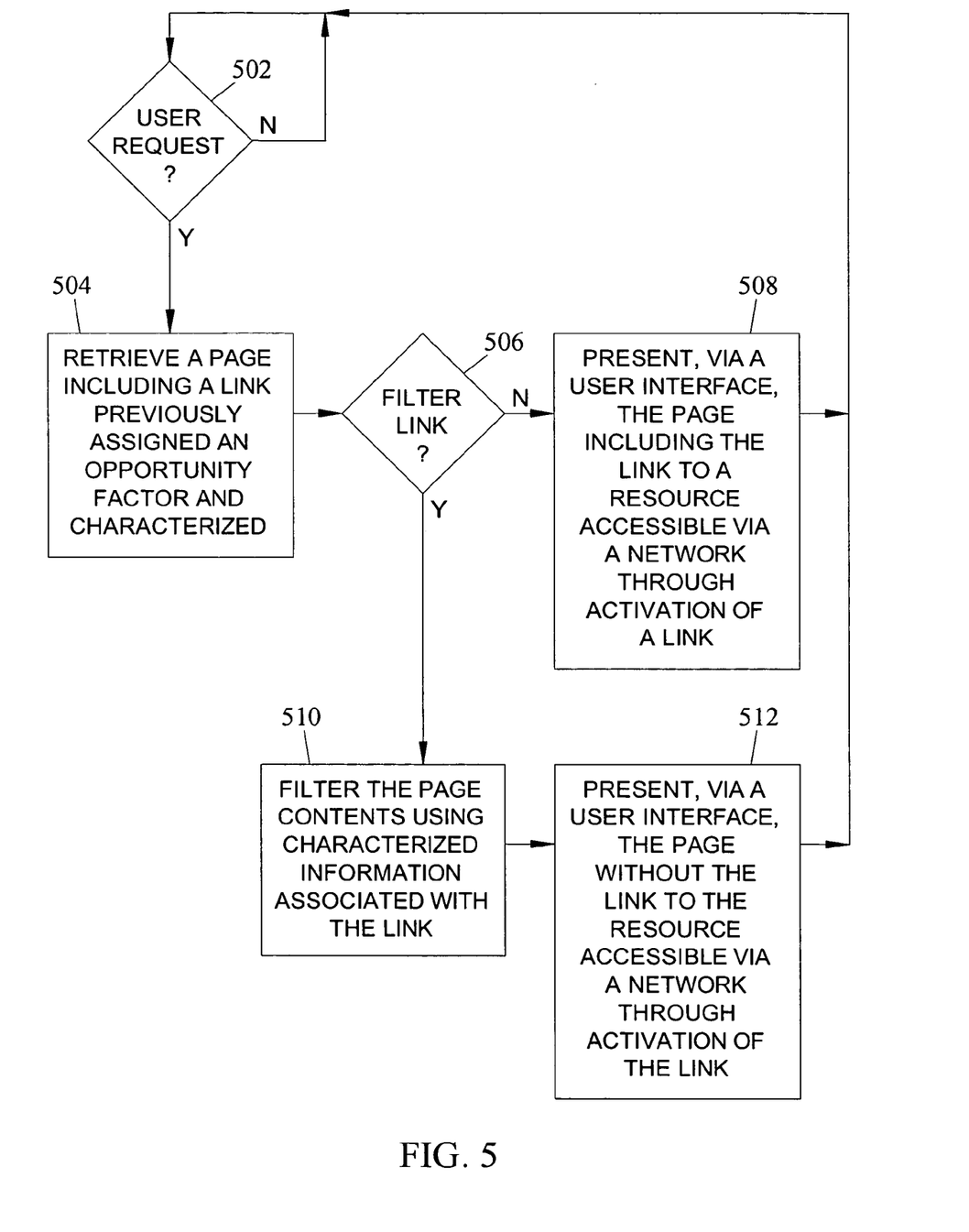
FIG. 5 is a flow chart illustrating an exemplary process for filtering content within a page based upon indexed resources associated with links to resources not activated previously within a page in a browser according to an embodiment of the subject matter described herein.

FIG. 5 illustrates an exemplary process for filtering content within a page based upon indexed resources associated with links not activated previously within a page in a browser. At decision point 502, the process may wait for a user request to present a page. At block 504, the process may retrieve a page including a link previously assigned an opportunity factor and characterized.

At decision point 506, the process may make a determination as to whether to filter the link from the page based upon the previously assigned opportunity factor and categorization. When a determination is made at decision point 506 not to filter the link from the page, the page may be presented, via a user interface, including the link to a resource accessible via a network through activation of the link at block 508 and the process may return to decision point 502 to await a new user request.

When a determination is made at decision point 506 to filter the link from the page based upon the previously assigned opportunity factor and characterization, the page contents may be filtered using the characterized information associated with the link at block 510. At block 512, the page may be presented, via the user interface, without the link to the resource accessible via a network, the resource accessible through activation of the link, or with the link repositioned and/or reformatted as indicated by the one or more filters.

A system for indexing resources associated with links not activated includes means for presenting, via a user interface, a page including a link to a resource accessible via a network through activation of the link. For example, browser 114 may present a web page including an HTML link to a resource, such as another web page or a file, accessible via a network through activation of the link.

The system also includes means for determining, based on an opportunity factor, whether the link on the page is not activated. For example, browser 114 may determine by use of content manager 122 and content handler 132, when a user has had an opportunity to select a link and has not done so.

The system also includes means for characterizing the link based on at least one of information associated with the link and information associated with the opportunity factor when the link is not activated. For example, rank generator 220 may use data associated with links not activated, including contextual data, to rank or characterize links not activated.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for characterizing links to resources that are not activated, the method comprising:
   presenting, via a user interface of a client device, a page including a link to a resource accessible through activation of the link;
   determining, by the client device, whether the link on the page is not activated;
   determining, by the client device, based on contextual information associated with the link, an opportunity factor representing an opportunity to activate the link that has not been activated; and
   characterizing the link based on at least one of information associated with the link, the resource, the page and the opportunity factor responsive to determining that the link is not activated.

2. The method of claim 1 wherein the opportunity factor is determined based on a number of times the link appears within the page on the user interface.

3. The method of claim 1 wherein the opportunity factor is determined based on a number of times the page with the link is displayed on the user interface.

4. The method of claim 1 wherein the opportunity factor is determined based on a location of the link within the page on the user interface.

5. The method of claim 1 wherein the opportunity factor is determined based on a type of link including one of a text type link, an icon type link, and a flash type link.

6. The method of claim 1 wherein the opportunity factor is determined based on a size of a container within which the link is presented.

7. The method of claim 1 wherein the opportunity factor is determined based on at least one of a total time, a mean time, a median time, a mode time, a maximum time, and a minimum time the link was within a viewable area of the user interface.

8. The method of claim 1 wherein the opportunity factor is determined based on a number of links other than the link within the page.

9. The method of claim 1 wherein the opportunity factor is determined based on attributes of the link provided by the server.

10. The method of claim 1 comprising determining a first user preference value associated with the link based on the characterization of the link.

11. The method of claim 10 comprising comparing the first user preference value to a preference threshold associated with the link and taking an action based upon a result of the comparison.

12. The method of claim 11 wherein taking an action includes preventing display of the link in response to access to pages that include the link.

13. The method of claim 10 comprising updating the first user preference value associated with the link based on user preferences collected for other links.

14. The method of claim 10 comprising communicating the first user preference value to a server.

15. The method of claim 14 wherein the server includes a search engine and wherein the method further comprises using the first user preference value to control search results presented to a user.

16. The method of claim 14 wherein the server includes a web server and wherein the method further comprises storing the first user preference value at a server.

17. The method of claim 10 comprising, in response to a search request, querying a server with a search criterion and filtering search results returned by the server using the first user preference value.

18. The method of claim 10 comprising, in response to a search request, querying a server with a search criterion and reordering search results returned by the server using the first user preference value.

19. The method of claim 10 comprising, in response to a search request, querying a server with a search criterion and customizing search results returned by the server using the first user preference value.

20. The method of claim 19 wherein customizing includes at least one of highlighting, bolding, and italicizing the search results.

21. The method of claim 1 comprising modifying the characterization of the link based on information regarding other links including other links accessed by a user or other links not accessed by the user.

22. The method of claim 1 wherein characterizing the link includes storing a reference to the link and the characterization of the link in a database.

23. The method of claim 1 wherein the page includes a web page and wherein the webpage includes at least one of a hypertext markup language (HTML) element and extensible markup language (XML) element.

24. The method of claim 1 wherein the link includes a link of a type including a text link, an icon link, and a flash link.

25. A system for characterizing links to resources that are not activated, the system comprising:
at a client device:
a user interface for displaying a page including a link to a resource accessible via a network through activation of the link;
a content handler for parsing data on the page to identify the link;
a content monitor for determining whether the link on the page is not activated and for determining, based on contextual information associated with the link, an opportunity factor representing an opportunity to activate the link that has not been activated; and
a context monitor for characterizing the link based on information associated with at least one of the link, the resource, the page and the opportunity factor responsive to determining that the link is not activated.

26. The system of claim 25 wherein the opportunity factor is determined based on a number of times the link appears within the page on the user interface.

27. The system of claim 25 wherein the opportunity factor is determined based on a number of times the page with the link is displayed on the user interface.

28. The system of claim 25 wherein the opportunity factor is determined based on a location of the link within the page viewed by user.

29. The system of claim 25 wherein the opportunity factor is determined based on a type of link including one of a text type link, an icon type link, and a flash type link.

30. The system of claim 25 wherein the opportunity factor is determined based on a size of a container referencing the link.

31. The system of claim 25 wherein the opportunity factor is determined based on at least one of a total time, a mean time, a median time, a mode time, a maximum time, and a minimum time the link was within a viewable area of the user interface.

32. The system of claim 25 wherein the opportunity factor is determined based on a number of links other than the link within the page.

33. The system of claim 25 wherein the content monitor is adapted to determine a first user preference value associated with the link based on the characterization of the link.

34. The system of claim 33 wherein the content monitor is adapted to compare the first user preference value to a preference threshold associated with the link and to take an action based upon a result of the comparison.

35. The system of claim 34 wherein, in taking an action, the content monitor is adapted to prevent display of the link in response to access to pages that include the link.

36. The system of claim 33 wherein the content monitor is adapted to update the first user preference value associated with the link based on user preferences collected for other links.

37. The system of claim 33 comprising a client index agent and a server, wherein the client index agent is adapted to communicate the first user preference value to the server.

38. The system of claim 33 wherein the server includes a search engine and wherein the server is adapted to use the first user preference value to control search results presented to a user.

39. The system of claim 33 wherein the server includes a web server and wherein the server is adapted to store the first user preference value.

40. The system of claim 33 comprising a client index agent adapted to issue a query to a server in response to a search request and wherein the content handler is adapted to filter search results returned by the server using the first user preference value.

41. The system of claim 33 comprising a client index agent adapted to issue a query to a server in response to a search request and wherein the content handler is adapted to reorder search results returned by the server using the first user preference value.

42. The system of claim 33 comprising a client index agent adapted to issue a query to a server in response to a search request and wherein the content handler is adapted to customize search results returned by the server using the first user preference value.

43. The system of claim 42 wherein the content handler being adapted to customize search results includes being adapted for at least one of highlighting, bolding, and italicizing the search results.

44. The system of claim 25 wherein the content manager is adapted to modify the characterization of the link based on information regarding other links selected from a group consisting of other links accessed by a user and other links not accessed by the user.

45. The system of claim 25 comprising an index manager for storing a reference to the link and the characterization of the link in a database.

46. The system of claim 25 wherein the user interface is adapted to display the page in the format of a web page selected from a group consisting of a hypertext markup language (HTML) page and an extensible markup language (XML) page.

47. The system of claim 25 comprising a database for storing information associated with the link.

48. A system for characterizing links to resources that are not activated, the method comprising:
means for presenting, via a user interface of a client device, a page including a link to a resource accessible via a network through activation of the link;
means for determining, by the client device, whether the link on the page is not activated and for determining, by the client device, based on contextual information associated with the link, an opportunity factor representing an opportunity to activate the link that has not been activated; and
means for characterizing the link based on at least one of information associated with the link, the resource, the page and the opportunity factor responsive to determining that the link is not activated.

49. A computer program product comprising computer-executable instructions embodied in a computer-readable medium for performing steps comprising:
  presenting, via a user interface, a page including a link to a resource accessible via a network through activation of the link;
  determining, by the client device, whether the link on the page is not activated;
  determining by the client device, based on contextual information associated with the link, an opportunity factor representing an opportunity to activate the link that has not been activated; and
  characterizing the link based on at least one of information associated with the link, the resource, the page and the opportunity factor responsive to determining that the link is not activated.

* * * * *

UNITED STATES PATENT AND TRADEMARK OFFICE
CERTIFICATE OF CORRECTION

PATENT NO. : 7,631,263 B2  Page 1 of 1
APPLICATION NO. : 11/446606
DATED : December 8, 2009
INVENTOR(S) : Robert P. Morris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Twenty-first Day of December, 2010

David J. Kappos
*Director of the United States Patent and Trademark Office*